L. HILDRETH.
ANIMAL TRAP.
APPLICATION FILED OCT. 27, 1913.
1,106,382.
Patented Aug. 11, 1914.
2 SHEETS—SHEET 1.
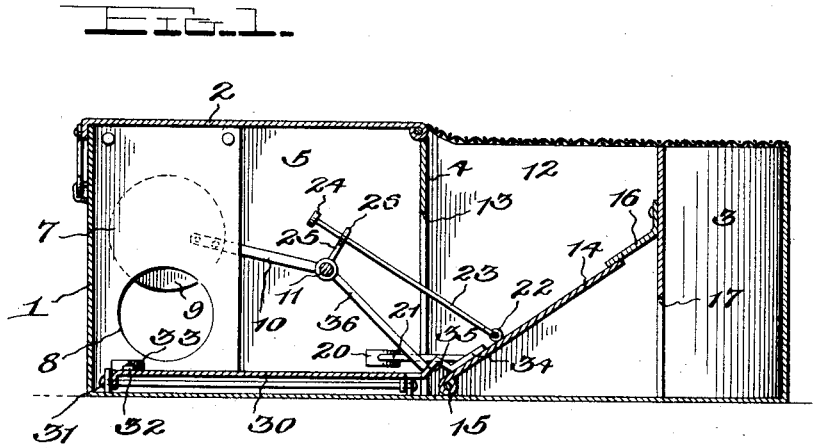
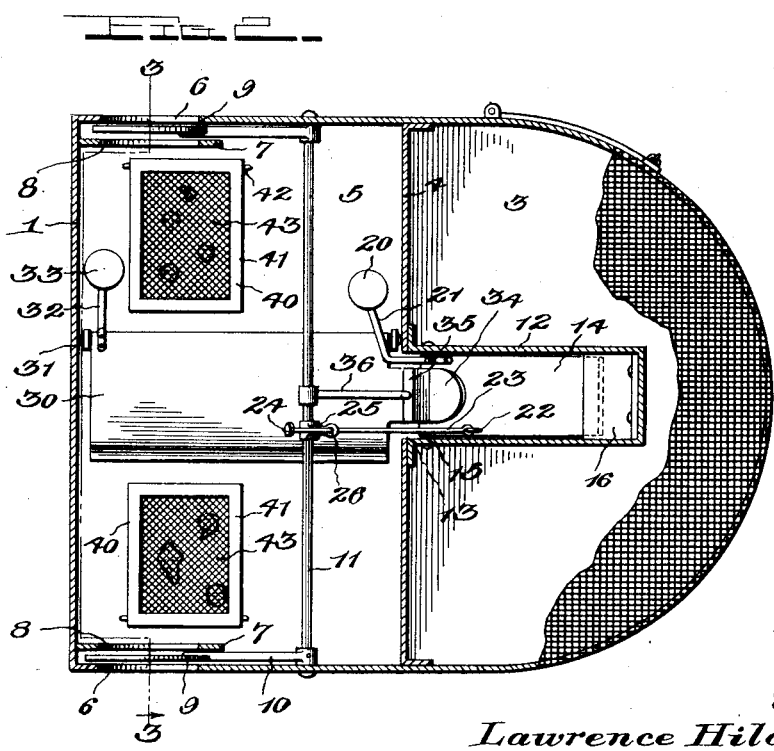
Inventor
Lawrence Hildreth,

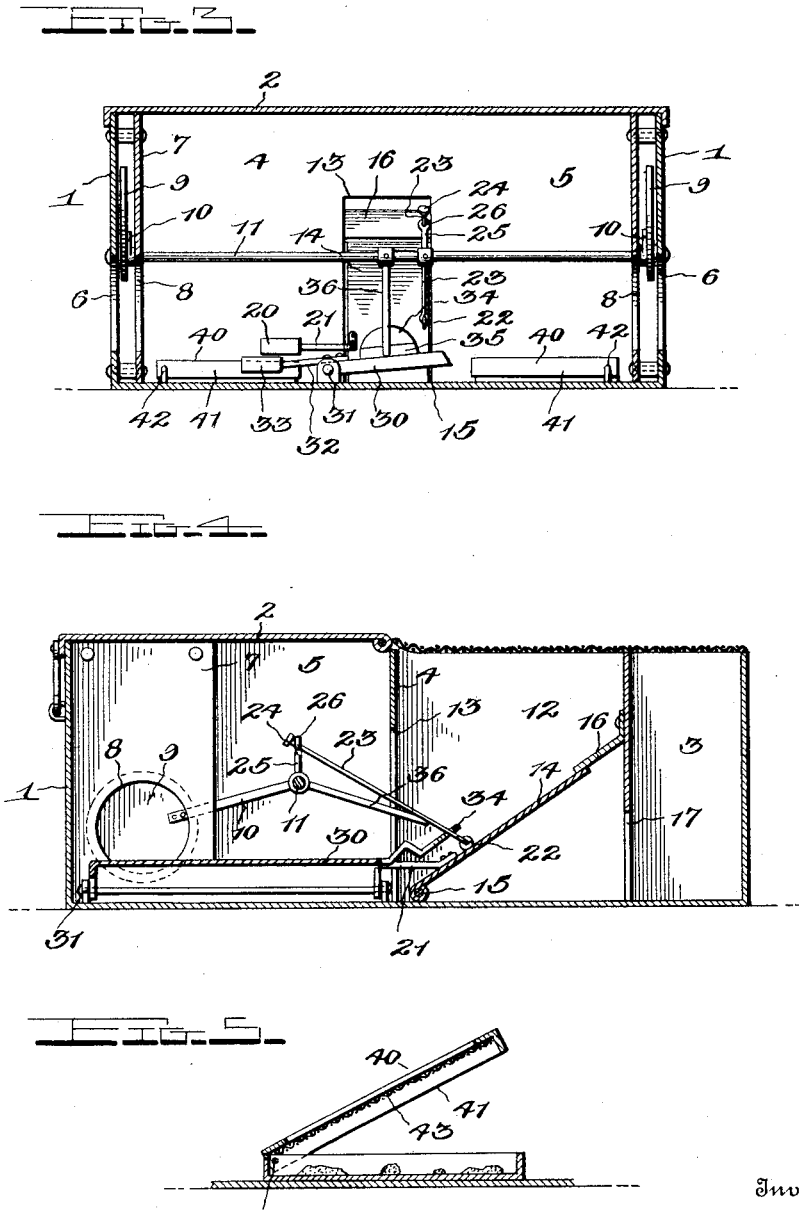

UNITED STATES PATENT OFFICE.

LAWRENCE HILDRETH, OF LEXINGTON, KENTUCKY.

ANIMAL-TRAP.

1,106,382.

Specification of Letters Patent.  Patented Aug. 11, 1914.

Application filed October 27, 1913.  Serial No. 797,660.

*To all whom it may concern:*

Be it known that I, LAWRENCE HILDRETH, a citizen of the United States, residing at Lexington, in the county of Fayette and State of Kentucky, have invented certain new and useful Improvements in Animal-Traps; and I do declare the following to be a full, clear, and exact description of the invention, such as will enable others skilled in the art to which it appertains to make and use the same.

This invention relates to traps, and more especially to those which are set by the passage of the victim from the trap proper into the cage; and the object of the same is to produce certain improvements on my former Patent Number 1061477, issued May 13, 1913. This object is accomplished by the construction described and claimed below, and as shown in the drawings wherein—

Figure 1 is a central vertical longitudinal sectional view of this improved trap. Fig. 2 is a horizontal section. Fig. 3 is a sectional detail on the line 3—3 of Fig. 2. Fig. 4 is a section similar to Fig. 1 with the parts in their different positions. Fig. 5 is an enlarged sectional detail of the bait holder.

As before, this trap comprises a body portion 1 having a hinged top 2, a receiving cage 3 attached to one side of the body portion and separated therefrom by an upright transverse partition 4, forward of which is what might be called the bait compartment 5. In the end walls of the latter are inlet openings 6, and adjacent said walls parallel therewith are upright partitions 7 provided with registering inlet openings 8. Between each end wall and the adjacent partition is a door 9 carried by an arm 10 fixed to the rock shaft 11 which extends throughout the length of the bait compartment, and the weight of the doors will cause them to drop over the inlet openings when the rock shaft is free. A runway 12 opens at 13 through the partition 4 and extends into the cage 3, and within this runway is disposed a false bottom 14 pivoted at 15 in the runway near the opening 13 and adapted when raised into contact with a stop 16 to close the outlet 17 from the runway into the cage. No novelty is claimed on the parts thus far described. The purpose of the present invention is to simplify the entire trap and reduce its number of parts, doing away with springs and improving the construction of the bait holder; and in applying the improvements I make use of as much of the former mechanism as already described. Coming now to the details of the present invention, the rear or free end of said false bottom 14 is held normally raised against the stop 16 by means of a weight 20 mounted on the forward end of a stiff wire or rod 21 which projects from the false bottom near its pivoted end through the inlet opening 13 into the runway, so that the weight stands within the bait compartment 5 and does not choke the passage in said runway. Secured to the bottom 14 at a point 22 which is about midway of its length and adjacent one edge, is a link 23 which may well be a stout wire or rod, the same projecting through the openings 13 and having a head 24 at its forward end. Rising from the rock shaft 11 is an arm 25 having an eye 26 at its upper end loosely receiving said link 23. The result of this construction is that when the animal passes over and depresses the false bottom 14 the link draws on the arm 25 and raises the doors 9 to reset the trap. For holding said doors elevated and the cage reset I provide a treadle 30 which may be of sheet metal hinged along one edge at 31 to the true bottom of the bait compartment 5 and having a rod 32 projecting from its hinged edge and carrying a weight 33 so as to normally raise the treadle slightly above the floor. The rear end of this treadle carries a lip 34 having on its upper face a shoulder 35, and a finger 36 depends rigidly from the rock shaft 11 in position to pass over and engage said shoulder at a time when the treadle is not fully depressed but the doors 9 are raised.

A striking feature of the present invention is that the lip 34 projects slightly into the opening 13 and overlies the false bottom 14 within the runway so that an animal which has been enticed within the bait compartment will trip the support for the doors 9 and trap himself if he steps upon the treadle 30, or will produce the same result if he steps upon the lip 34 in an effort to enter the runway 12. In other words, he cannot possibly pass through the runway into the cage without tripping the rock shaft and closing the doors 9. As he passes over the bottom 14 his weight depresses it, and the link 23 resets the trap by rocking the shaft 11 and raising the doors until the lower end of the finger 36 reëngages the shoulder 35.

The bait holder is best seen in detail in Fig. 5. This consists of a rectangular sheet metal box 40 secured upon the floor of the bait compartment and with its top open, and a closure consisting of a sheet metal frame 41 hinged at 42 to the box and having a flat top 43 of wire mesh. When it is raised and bait such as powdered cheese sprinkled within the box and the top dropped back into place, the mice or other animals to be caught can see and can smell the cheese but cannot get at it, and in fact they are induced to pass directly over the wire mesh top 43 in an effort to get at the cheese or other bait and in doing so they are extremely likely to step on the treadle 30 and trap themselves. It is quite possible, as will be seen, for two animals to enter the trap simultaneously and be caught therein, and once caught in the bait compartment they have no egress from it excepting through the passage 13 and runway 12, and therein they reset the trap in the manner above described.

I would make this device entirely of metal for sanitary reasons and in order that it may be washed or even boiled. It will be observed that no springs are used, and the parts are extremely few and the construction simple.

The trap is set in the first instance by raising the hinged top and moving the knob or head 24 to the rear; this rocks the shaft and raises the doors 9, engaging the finger 36 behind the shoulder 35 so that the parts stand as above explained.

What is claimed as new is:

The herein described trap comprising a body divided by a cross partition into a bait compartment at its front end and a cage at its rear end, the walls having inlet openings into the ends of said compartment and an outlet opening through said partition, a runway whose walls surround said outlet opening and project into the cage and whose open rear end has a stop, a false bottom hinged at its front end within said runway, a rod projecting from said hinged end through the opening in the partition into the bait compartment and carrying a weight normally raising the free end of said false bottom against said stop; a rock shaft, arms projecting therefrom and carrying doors overlying the inlet opening into the bait compartment, an arm rising from said rock-shaft and having an eye, a link pivoted to said false bottom and projecting through said eye and having a head, a treadle hinged at one edge to the bottom of the bait compartment and having a lip at one end projecting through the opening in the partition and provided with a shoulder, a finger on said rock shaft adapted to engage said shoulder, a rod projecting from the hinged edge of said treadle and carrying a weight holding the treadle normally raised, and a lure within said compartment.

In testimony whereof I have hereunto set my hand in presence of two subscribing witnesses.

LAWRENCE HILDRETH.

Witnesses:
R. D. McMichael,
L. A. Ruckno.